June 2, 1942.                J. T. CORLEY                2,285,111
                              SHUT-OFF VALVE
                    Filed Jan. 24, 1939         2 Sheets-Sheet 1

Inventor
John T. Corley
Nathaniel Frucht
By
Attorney

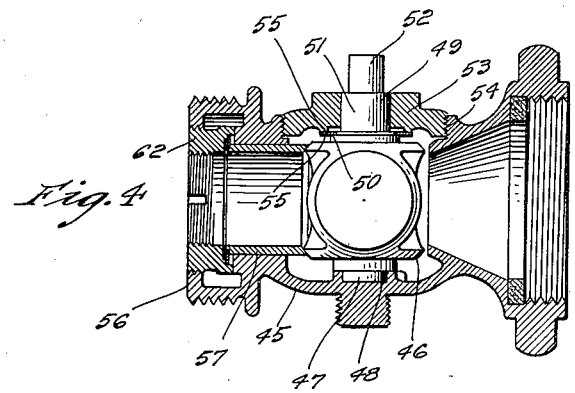
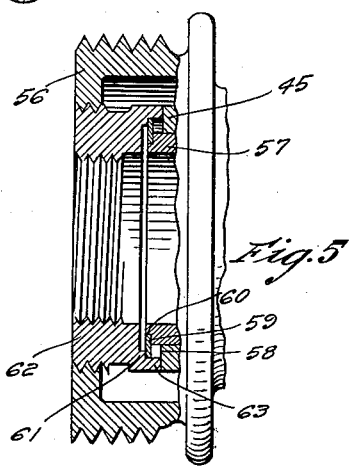
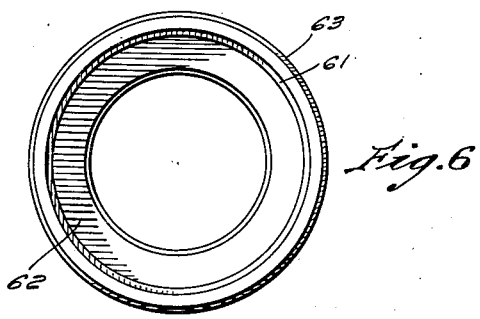
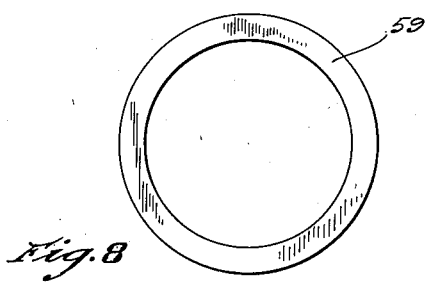

Patented June 2, 1942

2,285,111

UNITED STATES PATENT OFFICE 2,285,111

SHUTOFF VALVE

John T. Corley, Providence, R. I.

Application January 24, 1939, Serial No. 252,647

3 Claims. (Cl. 251—113)

This application is a continuation in part of application Serial No. 29,293 for Fire fighting equipment, filed July 1, 1935, now Patent 2,144,619, granted January 24, 1939.

My present invention relates to fire fighting equipment, and has particular reference to shut-off valves for fire hose.

Nozzle attachments for fire hose, when equipped with shut-off valves, have required periodic inspection and replacement of rubber gaskets, particularly when the local water used, the addition of chemicals, or the use of chemical solutions, has a deteriorating effect on the rubber gaskets. It is the principal object of my invention to provide a valve structure which is easily manufactured and assembled, which has no rubber or other gaskets and is not affected by water conditions and the like, and which requires no replacement of parts during the life of the valve.

With the above and other objects and advantageous features in view, my invention consists of a novel method of manufacture and assembly, and a novel arrangement of parts more fully disclosed in the detailed description following, in conjunction with the accompanying drawings, and more specifically defined in the claims appended hereto.

In the drawings:

Fig. 4 is a sectional view of a modified valve construction;

Fig. 5 is an enlarged detail section of one end thereof;

Fig. 6 is a plan view of the end ring;

Fig. 7 is a side view of the end ring; and

Fig. 8 is a plan view of the packing ring.

Figure 1:
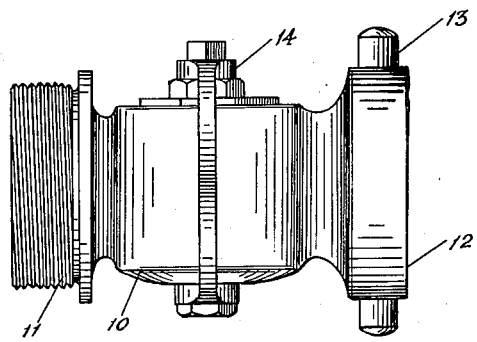
Fig. 1 is a side elevation of the novel valve.
Figure 2:
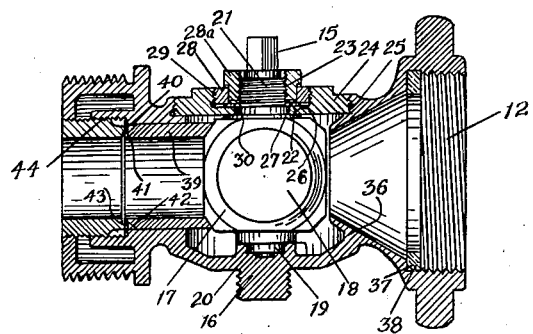
Fig. 2 is a vertical central section thereof.
Figure 3:
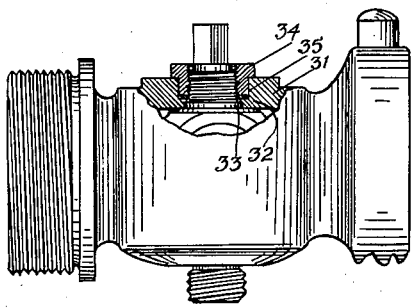
Fig. 3 is a view similar to Fig. 1, but broken away to show a modified bearing packing.

Referring to Figs. 1 to 3 of the drawings, the valve casing 10 has one end 11 threaded with an external standard thread, for example, national standard 2½ inch thread, and the other end 12 threaded with an internal standard thread, preferably the same national standard 2½ inch, this end being provided with shut-off turning lugs 13 of any desired type; a handle 14 is mounted on the squared end 15 of the valve stem and on a threaded boss 16. This construction permits use of the valve as a connection between hose lengths.

The valve 17, see Fig. 2, is preferably of the globe type, having a radial port or passageway 18, the sides of the valve being flattened at right angles to the port to facilitate free turning and relieve back pressure, and has one end 19 stepped and rotatably seated in a bearing 20, the stem 21 having a shoulder 22 and a reduced threaded portion 23 which terminates in the squared end 15. A circular bearing plate 24 is threaded into a threaded opening 25 in the valve body, and has a bearing shoulder 26 which contacts the shoulder 22 and has its upper surface in alignment with the upper surface thereof, thus permitting a packing ring 27 to seat over the joint between the two shoulders.

A lock ring 28 threadedly engages internal threads 29 of the bearing plate body so as to grip the outer portion of the packing ring, and a second lock ring 28a is threadedly seated on the stem portion 23, and is movable within the lock ring 28 to grip the inner portion of the packing ring, preferably through an intermediate smaller packing ring 30.

It is thus evident that the novel packing includes a ring which seats over the joint between a valve stem shoulder and a bearing plate shoulder, this ring being independently gripped or held at its concentric inner and outer portions. Since the outer grip is substantially a solid grip, the bearing plate may be formed as indicated at 31 in Fig. 3 with an integral projection 32 contacting the valve stem shoulder and an integral ring 33 seating on the valve stem shoulder, whereby one inner lock ring 34 and one packing ring 35 may seal the joint. Although this construction is simpler, the first described construction is preferred, as it is possible to use a packing ring of a metal different from the bearing plate metal.

The end 12 of the valve has a conical portion 36 serving as an entrance passageway, and has a shoulder 37 for receiving the usual heavy packing ring 38; the end 11 is cylindrically bored to receive a tubular packing cylinder 39 seated on the valve, and has a shoulder 40 which is aligned with a collar 41 on the cylinder 39, this collar being formed by bevelling or tapering the end of the cylinder; a packing ring 42 is seated on the spaced shoulder and at the collar and is locked in place by the annular bead or projection 43 of a lock ring 44 threadedly mounted in the upper portion of the valve end 12. This construction exerts a central pressure on the packing ring and bends the ring transversely to obtain a very effective seal.

Instead of gripping the packing ring at its outer portions and its inner portion, a simpler arrangement may be used where expense is a disideratum, as illustrated in Figs. 4 to 7. The valve casing 45 is similar in form to the casing 10, and the globe valve 46 has one end 47 stepped and rotatably seated in a bearing 48, the stem 49 having a shoulder 50 and a reduced portion 51 which terminates in the squared end 52. A circular bearing ring 53 is threaded in a threaded opening 54 in the valve body, and has a bearing shoulder 55 which contacts the outer surface of a metal packing ring 55a which seats on the stem shoulder 50.

The outflow end 56 of the valve is cylindrically bored to receive the tubular packing cylinder 57 seated on the valve, and has an annular shoulder 58 adjacent the end of the cylinder 57; a metal packing ring 59 is seated on an annular recess 60 formed on the end of the cylinder, and is locked in place by an annular shoulder 61 of a lock ring 62 which is threadedly mounted in the upper portion of the valve end 56, the lock ring having a depending annular foot 63 engaging the shoulder 58. The foot is of such length that the packing ring 59 is gripped tightly at its outer surface by the shoulder 61 and is pressed tightly at its inner surface by the recess 60, so as to provide a bending action on the packing ring.

The above construction thus utilizes the resilient action of the metallic packing ring against annular twist to provide an inexpensive, all metal packed, fluid valve.

While I have described specific details of the structure and arrangement of the novel apparatus, it is evident that changes in the sizes, relative proportions, and relative arrangements of the parts, may be made to suit the requirements for different installations and uses, within the spirit and the scope of the invention as defined in the appended claims.

I claim:

1. In a valve, a housing having a passageway therethrough, a globe valve mounted therein, a tubular packing cylinder engaging said globe valve, said cylinder having an annular shoulder and an annular flange extending from said shoulder, a metal packing ring having its central portion seated on said shoulder and its inner edge seated on said flange, and a lock ring mounted in said valve, said lock ring having an annular shoulder engaging the outer portion of said packing ring and an annular flange extending from said shoulder and engaging the outer periphery of said packing ring.

2. In a valve, a housing having a passageway therethrough, a globe valve mounted therein, a tubular packing cylinder engaging said globe valve, said cylinder having an annular shoulder and an annular flange extending from said shoulder, a metal packing ring having its central portion seated on said shoulder and its inner edge seated on said flange, and a lock ring mounted in said valve, said lock ring having an annular shoulder engaging the outer portion of said packing ring and an annular flange extending at right angles from said shoulder and engaging the outer periphery of said packing ring.

3. In a valve, a housing having a passageway therethrough, a globe valve mounted therein, a tubular packing cylinder engaging said globe valve, said cylinder having an annular shoulder and an annular flange extending at right angles from said shoulder, a metal packing ring having its central portion seated on said shoulder and its inner edge seated on said flange, and a lock ring mounted in said valve, said lock ring having an annular shoulder engaging the outer portion of said packing ring and an annular flange extending at right angles from said shoulder and engaging the outer periphery of said packing ring.

JOHN T. CORLEY.